Patented Mar. 1, 1927.

1,619,679

UNITED STATES PATENT OFFICE.

ERIC HANNAFORD RICHARDS AND HENRY BROUGHAM HUTCHINSON, OF HERTFORD-SHIRE, ENGLAND, ASSIGNORS TO ADCO LIMITED, OF LONDON, ENGLAND, A BRITISH COMPANY.

MANUFACTURE OF NITROGENOUS FERTILIZERS.

No Drawing. Application filed April 15, 1924, Serial No. 706,717, and in Great Britain April 23, 1923.

The present invention is for improvements in and relating to the manufacture of nitrogenous fertilizers.

The invention is based upon certain fermentative changes which, it has been found by us, may be brought about between suitable carbonaceous matter and nitrogenous compounds through the agency of a special group of micro-organisms which require nitrogen for the elaboration of their own cell structures. These organisms are obligatory aerobes, and under proper aerobic conditions in presence of nitrogen and of suitable carbonaceous material they take up nitrogen, and carbon from the more digestible constituents of the organic matter, and effect the combination of these two elements with production of water-insoluble nitrogenous derivatives in their own cell structures or excretions. These organisms are normally present in soil and hence are found in materials such as straw, dead leaves, bracken, maize stalks, and other organic matter which has been in contact with the soil. Organic matter in which these organisms are present, or which has been specially inoculated with them, may be conveniently designated as fermentable carbonaceous material.

It was found by us that under suitable conditions this specific group of organisms may be caused preferentially to develop in presence of an appropriate carbonaceous substance and nitrogen supply so as to give rise to the production of the said new compounds of nitrogen in such quantity as to make the resulting material of practical large-scale application as a nitrogenous fertilizer, for, as we also found, these new compounds, although water-insoluble, are, on contact with the soil, readily available to plants. But the action of the aforesaid organisms has definite limits and for its successful application to such utilization of nitrogen essential factors are an adequate period of contact between the carbonaceous matter and the nitrogen yielding material, the maintenance of proper aerobic conditions, and the avoidance of an over-concentration of soluble nitrogen in contact with the carbonaceous material, a concentration beyond a certain limit (broadly speaking, a concentration represented by an excess over 100 parts of soluble nitrogen per 100,000 parts of solution) being inimical to the life of the operative organisms. These organisms may be conveniently designated ammonia assimilators in virtue of their capacity for transforming simple ammoniacal nitrogen into organic combination, although it is not to be inferred that their action is necessarily restricted to an initial nitrogen supply in ammoniacal form, the essential being that the original state of nitrogen combination is changed and with the production of new, water-insoluble, organic compounds of fertilizing properties.

If an appropriate nitrogenous compound be brought into contact with such a fermentable carbonaceous material, for instance, straw, and fermentation be allowed to proceed under suitable conditions the nitrogen is transformed as aforesaid and the new insoluble nitrogenous derivatives are retained by the carbonaceous material, now partially fermented. Different kinds of the said fermentable substances are distinguished one from another in respect of capacity for retaining the insoluble nitrogen compounds so formed. The property of maximum retention may be described as "loading" with the insoluble derivatives in question, and the retentive capacity of each kind of material appears to be strictly limited. A preliminary investigation, however, suffices to determine the retentive capacity of a given material and therefore to fix the conditions for obtaining a fully "loaded" product from whatever material may be most conveniently available in a particular locality.

We have now found that by the employment of nitrogenous compounds, which may be regarded from the practical standpoint as insoluble in water, an efficient fertilizing material may be produced through the action of the aforesaid group of organisms with a high economic utilization of the original nitrogen by the aid of relatively low skilled labour, the operations involved being both few and simple in character. The invention is, therefore, particularly adaptable where comparatively unintelligent supervision only is available. The process is also specially economical in respect to consumption of reagents, as material loss of nitrogen is practically impossible, while in addition, a high degree of nitrogen conversion is obtainable.

The terms "soluble" and "insoluble" are employed in this specification as denoting respectively solubility and insolubility in water.

According to the present invention, an organic nitrogenous fertilizer is manufactured by bringing together a fermentable carbonaceous substance as hereinbefore defined and an insoluble, or difficultly soluble, hydrolyzable compound of nitrogen and maintaining these materials in contact in an hydrated state under conditions permitting free development of the ammonia assimilator organisms in the carbonaceous substance, that is to say, under conditions combining a high degree of hydration of said substance with ready access of oxygen thereto, for a period of time sufficient to permit said organisms to transform the initially supplied nitrogen into new insoluble compounds of organically combined nitrogen of the type aforesaid in substantial quantity within the fermented mass.

By a substantial quantity is meant a quantity sufficient to render the fermented mass practicably utilizable as a nitrogenous manure, the minimum figure being 50% of the possible loading, as shown by preliminary assay and, as will be readily appreciated, the attainment of such a result is, other conditions being fixed, dependent upon an adequate period of contact between the carbonaceous material and the initial nitrogenous body. If this period is so short that only the minimum figure (50% of the loading) is attained, the result is a poor slow-acting manure. A fermentation mass which has not lost 20% of its dry matter and has not attained 50% of its possible loading is of little value as a fertilizer. While a substantial quantity in the sense indicated of re-combined nitrogen is to be understood as within the ambit of the invention, it is preferred, both for the purpose of obtaining the most efficient fertilizer and of facilitating the process of manufacture, to allow the fermentation to proceed to that point at which the carbonaceous substance is "loaded" or substantially so, with organic re-combined nitrogen, the minimum figure for total nitrogen in the dry matter of the final manure being 1–5%. The degree of nitrogen-transformation may be determined by chemical assay, but one advantage of proceeding to the stage of "loading" is that this point may be judged by the workman himself from the appearance and general nature of the mass. The vegetable matter has lost its strength, and is generally much changed in colour. For instance, with straw, the finished product no longer possesses the typical yellow colour of straw, but is of a chocolate hue, and there is a peculiar "mucous" feel about the material. With a properly rotted (i. e. fermented) product from straw, substantially 90 per cent of the total nitrogen should be in organic combination.

In the specification of U. S. Patent No. 1,471,979, the inventors of the present invention have described a process in which application is made of the fermentative changes found to be effected by the aforesaid organisms between suitable carbonaceous material and already prepared solutions of soluble nitrogen for the purpose of preparing a fertilizer in which the transformed nitrogen is in water-insoluble organic combination, but, nevertheless easily plant-available on contact with the soil.

The present invention, as well as the invention of the aforesaid U. S. patent, are quite distinct from those processes which depend upon the fixation of atmospheric nitrogen or upon fermentations designed to produce the plant nutritive nitrogen in ammoniacal form (ammoniacal fermentations). The invention depends upon a quantitative assimilation of soluble nitrogen, arising from an initial breaking down (which may take place by known chemical or bio-chemical processes) of the original nitrogenous compound, whereby said soluble nitrogen is transformed into organic combination with carbohydrate, such as pentosans and starch, in a definite ratio under the influence of a special well defined group of aerobic organisms which acting as ammonia assimilators bring about a quantitative change of soluble nitrogen into protein or like nitrogenous combinations. The reaction is quantitative in the sense that for a given type of carbohydrate a definite proportion of nitrogen enters into combination, the actual ratio depending upon the particular form of carbohydrate, and the reaction is also quantitative in the sense that if properly conducted there is substantially complete conversion of the original nitrogen into organic combination.

The fertilizer prepared according to the present invention is comparable in nitrogen fertilizing qualities with well matured farm-yard manure, and is best characterized by its physical properties and the nature of its nitrogen content. The total nitrogen calculated on the dry matter is substantially between 1 or 1.3 to 5 per cent. If the fermentation has been carried only to the point of that minimum conversion of the original nitrogen which will give a practicable manure, namely, substantially 50 per cent, conversion, the fermentation product contains about 50 per cent of its organic nitrogen convertible to nitrate on contact with the soil within the normal growing period of the usual farm crop, say, for example, about one hundred days, and up to about 0.35 per cent of unconverted nitrogen, both calculated upon the dry matter. On the other hand, if the fermentation be carried to the degree of "loading" of the carbonaceous material with the new organically combined nitrogen, the product will contain over 50 per cent and even up to 60 to 65 per cent or over of its organic nitrogen convertible to nitrate on contact with the soil and a content of unconverted nitrogen down to about 0.1 per cent calculated upon the dry matter. In both cases the product as obtained from straw and the like is a soft, easily distributed mass compounded of fibrous material substantially homogeneously incorporated with colloidal matter which, for the most part, consists of insoluble nitrogenous compounds. The water-content of the product may be from about 60–85 per cent.

As the initial compound of nitrogen there may be employed any insoluble nitrogenous body which is hydrolyzable by water or by hydrolytic organisms or like enzymes, for instance, organic substances of a protein or colloidal nature such as abattoir refuse, blood and the like, or compounds such as alkaline-earth nitrides. The preferred compound is calcium cyanamide. This substance is but slightly soluble in water, but on contact with an appropriately hydrated fermentable carbonaceous material undergoes decomposition, the nitrogen being ultimately transformed into a different state of organic combination but which, as previously stated, is readily available to plants. The degree of conversion of the cyanamide nitrogen may be as high as 90–95 per cent. The relative insolubility of calcium cyanamide, without in any way interfering with the favourable fermentation reaction, carries with it the advantage that applied valuable nitrogen is not washed away by accidental excess of water.

Commercial calcium cyanamide is an impure material not only unpleasant to handle by reason of its properties and dusty nature but also not infrequently actually injurious to crops. For the purpose of the present invention, however, calcium cyanamide even in a crude commercial form may be successfully employed, the compound being destroyed as such and its nitrogen brought into a new state of combination readily available and more conveniently distributed to crops.

The carbonaceous material may consist of cereal, straws, maize-stalks, rice-refuse, dead leaves, bracken, bagasse and trash (from sugar cane) or other substances which contain an adequate total quantity of carbohydrate, (for example, 30 per cent upwards) such as starch, or pentosans, and preferably not too high a proportion of ligno-cellulose. Materials such as these are, as previously stated, generally already inoculated with the requisite aerobic organisms, but should this not be the case, the material may readily be inoculated by contact for a suitable period with some fertilizer (or liquor extract thereof) from a previous operation.

It is economic to calculate the proportion of the initial nitrogen to be added to the carbonaceous material for the fermentation. This proportion may be calculated on the original content of pentosans and/or starch. Thus, a quantity of calcium cyanamide may be taken to provide one part of elemental nitrogen to 20 to 60 parts of pentosan and/or starch in the raw material.

An appropriate reaction must be maintained within the fermenting mass, for if the latter becomes too acid the desired fermentation stops. A neutralizing agent, such as calcium carbonate, which may conveniently be employed in the form of chalk, may be added to the material to prevent too great an increase in acidity.

The fermentation mass may comprise a phosphate, and such phosphate may be normally unavailable phosphate such, for instance, as ground mineral phosphate, or basic slag. Superphosphate may be employed provided that excess acidity is neutralized so as to ensure a suitable reaction as aforesaid. In any event it is preferred to employ a phosphate of high phosphate content, and products such as basic slags of low phosphate content are not to be recommended. Natural ground phosphate, which is neutral and cheaply available with a high content in calcium phosphate, is both convenient and satisfactory. It seems that the phosphate added does not re-appear, at least entirely, in its original form in the fermentation product, for where a normally unavailable phosphate is employed the product contains a material quantity of phosphorus in a form more available as plant food. By such addition to the fermentation mixture it is, therefore, possible to obtain a fertilizer combining the advantageous properties of well matured farmyard manure with an available phosphorus content which is normally absent in the latter, and with the use of a source of phosphorus usually unavailable. The phosphate is also utilized by the means organisms concerned in the required nitrogen changes, and the excess unused in this way improves the value of the manure in the manner aforesaid.

The initial nitrogen may be provided by a solid nitrogen-bearing mixture composed essentially of a source of nitrogen in the form of a substantially water-insoluble hydrolyzable nitrogen compound, and a counter-acid neutralizing agent in substantial quantity, since the object of its presence is to control the acidity of the fermentation of the carbonaceous material, as previously indicated. Said counter-acid neutralizing agent may be some convenient form of calcium carbonate, such as chalk, which is itself neutral. Thus, the nitrogen-bearing mixture may consist essentially of waste protein material, such as dried blood, and a counter-acid neutralizing agent.

The mixture may also comprise a phosphate, such as a normally unavailable phosphate, as previously indicated as utilizable, for example, ground natural mineral phosphate, or basic slag; preferably of high phosphate content.

It will be appreciated that the proportions of the components of any given nitrogenous mixture may be varied according to requirements; and that with variation in the proportion of the nitrogen in the mixture, the proportion of the mixture per ton of the substantially dry carbonaceous material, for example straw, will be correspondingly adjusted.

The generally practicable range of proportions for compounding a nitrogen-bearing mixture according to this invention is represented by nitrogen, from 5–15 per cent, neutralizing agent (e. g. calcium carbonate), from 20–60 per cent; phosphorous (as $P_2O_5$) from 5–15 per cent. The phosphate may be an essential component when the waste vegetable matter available for the fermentation reaction is deficient in phosphorus; and a phosphate is generally preferred, in order to yield the best form of standard manure as the product of the fermentation.

It is advantageous that the components of the nitrogen-bearing mixture should be intimately admixed together, and in a state of subdivision.

One nitrogen-bearing mixture according to this invention, which is convenient for use and transport, comprises calcium cyanamide as the nitrogen source, a counter-acid neutralizing agent, and a neutral phosphate of calcium. such as ordinary mineral phosphate. Thus, such mixture may consist of calcium cyanamide (containing say, 18 per cent of nitrogen) mineral phosphate (about 60–80 per cent phosphate of lime), and chalk in powdered form, in substantially the proportion of 50 per cent of calcium cyanamide and 25 per cent each of the phosphatic material and chalk, these components being ground together to such a degree that about 60 per cent of the mixture will pass a 100 mesh sieve.

This mixture may be used in the proportion of 1½ cwt. per ton of the substantially dry carbonaceous material, for example, straw.

An adequate degree of hydration of the fermentation mass is an important factor for success, for insufficient water may result in a premature cessation of the desired fermentation. Our experience is that as a general rule, a high degree of hydration is necessary, but the actual degree of hydration in any given case must be adjusted according to circumstances such as the nature of the particular carbonaceous material employed. In the case of straw as ordinarily obtained in this country, we have found that fermentation practically ceases with a degree of hydration represented by a water-content of about 50 per cent, but that fermentation proceeds well with a water-content of 75–85 per cent, the latter figure representing the optimum degree of hydration for this particular carbonaceous product.

It may not be possible to obtain the desired higher degree of hydration for a satisfactory completion of the fermentation by a single addition of water. The required high degree of hydration may be obtained by adding the water in successive quantities at appropriate intervals of time, that is to say, at such intervals as will allow for the absorption of the quantity of water previously added, and permit of the further addition to be substantially all absorbed. For instance, in the case of straw, for which the optimum degree of hydration is represented by about 700 gallons of water per ton of dry straw, three separate additions of water may be made, but it is preferable to make more additions in smaller quantities, say six successive additions.

When the fermentation mixture has been brought to its maximum degree of hydration, care should be observed to maintain it in this condition to the completion of the fermentation by addition of further water as may be required from time to time to correct loss from evaporation.

A simple method of carrying the invention into effect consists in mixing the carbonaceous material and the initial nitrogenous compound together as intimately as is possible, thoroughly wetting the mixture with water and then leaving it to stand. A further addition of water may then be made when a substantial temperature rise is observable in the mass, this temperature indication being preferably obtained from some point well within the interior. This further addition of water should be such as thoroughly to saturate the mixture, but, in order to avoid mechanical loss of nitrogen, or exclusion of air, should not be so much as to produce a dripping-wet mass.

To ensure the maintenance of aerobic conditions, the heap may, with advantage, be turned over once or twice during the progress of the fermentation.

An alternative and preferred procedure is to intersperse the nitrogenous compound, (with or without phosphate and a neutralizing agent, as may be required), between superimposed beds of the already thoroughly wetted carbonaceous material, and thereafter to complete the hydration of the fermentable stack so produced by subsequent successive additions of the further quantity of water necessary to bring the stack to its optimum degree of hydration. Such successive additions may be made, as aforesaid, at appropriately spaced intervals of time, and with regard to the temperature indications previously mentioned.

When the carbonaceous material is liable to compact on wetting (for instance, when finely divided), or other conditions arise tending to impede free access of air to the fermentation mass, aeration of the latter may be effected or assisted by blowing air therethrough with or without mechanical agitation of the mass as may be found necessary, and such mode of aerating may also be employed when the carbonaceous material is of a loose nature such as straw.

The following is a description by way of example of one way in which the invention may be carried into effect:

One ton of loose straw is disposed upon an area of hard ground which, preferably, is sheltered from the wind. The straw is then initially hydrated by spraying with a hose or other convenient sprayer. Upon the surface of the well-wetted straw is then scattered, as evenly as possible, about 1½ cwt. of the special nitrogenous mixture referred to above consisting of 50 parts of calcium cyanamide (approximately 18 per cent of nitrogen), 25 parts of ground mineral phosphate (about 60–80 per cent of phosphate of lime) and 25 parts of powdered chalk, the whole mixture being ground to the fineness aforesaid. Another ton of loose straw is then laid over the first, and is wetted as before, and a further 1½ cwt. of the special nitrogenous mixture is distributed over the surface of the upper straw bed, and the building of the stack is continued until about ten tons of straw have been placed in position and partly wetted successively in the manner described. The quantity of water distributed on each layer of straw is about 200 gallons. The uppermost layer of the nitrogenous mixture is then covered with a few inches of straw and well wetted.

The stack is left to stand until the temperature in the centre has attained at least 80° F. The period of time for such a temperature change is variable, and may vary from a few days to as long as four weeks, but it seems that, other conditions being alike, large stacks "heat" considerably more quickly than smaller stacks.

When the temperature has arisen to 80° F., 200 gallons of water are applied at the top of the stack, and the same charge is distributed over the top of the stack at three day intervals, until a total of over 10,000 gallons of water in all has been applied. The stack is then left until completion of the fermentation as evidenced by the colour changes and other indications referred to above.

In building up a fermentation stack as just described, it is advantageous to have the top as level as possible and of a smaller area than the base, so that the sides slope downwards in pyramid fashion. The object aimed at is the exact opposite of that in view when building up a stack of corn; in the present case the aim is to secure the absorption and retention of water, while in the latter case the object is to prevent the ingress of water. As previously pointed out, care should be observed to maintain the appropriate degree of hydration throughout the fermentation, and as the top and sides of the stack tend to become dry, especially if there is exposure to wind, a small quantity of water should be added from time to time to compensate for this dehydration.

By the process of the present invention an organic nitrogenous fertilizer comparable in fertilizing properties with ordinary farmyard manure may be both simply and cheaply obtained, and such fertilizer may be so prepared with an improved content in available phosphorus and by the use of phosphatic material normally unutilizable for plant nutrition. In colour and general characteristics the fertilizer resembles the straw portion of farmyard manure, but is devoid of objectionable odour. In its power also of improving the physical quality of the soil the fertilizer prepared according to this invention may be regarded as equal to farmyard manure. If desired the hydrated material may be dried, with or without grinding of the dried product to a powder, without appreciable loss of fertilizing value, and such dried material may be described as a desiccated farmyard manure. The process is not only easy of manipulation, but also economical in nitrogen, loss of this valuable element being very greatly reduced. With a fermentation conducted with reasonable care to the degree of "loading" a conversion of the order of 90–95 per cent of the original insoluble nitrogen into re-combined available nitrogen is readily attainable.

We claim:—

1. The process of manufacture of an organic nitrogenous fertilizer, which comprises bringing together a fermentable carbonaceous substance and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially applied nitrogen into new, water-insoluble, organic nitrogenous compounds in substantial quantity within the fermented mass.

2. The process of manufacture of an organic nitrogenous fertilizer, which comprises bringing together a fermentable carbonaceous substance as hereinbefore defined and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially applied nitrogen into new, water-insoluble, organic nitrogenous compounds in substantial quantity within the fermented mass, and drying the fermented mass.

3. The process of manufacture of an organic nitrogenous fertilizer, which comprises bringing together a fermentable carbonaceous substance as hereinbefore defined and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially applied nitrogen into new, water-insoluble, organic nitrogenous compounds in substantial quantity within the fermented mass, drying the fermented mass and pulverizing the dried product.

4. The process of manufacture of an organic nitrogenous fertilizer, which comprises bringing together a fermentable carbonaceous substance and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially supplied nitrogen into new, water-insoluble, organic nitrogenous compounds to the degree of "loading" therewith the fermented mass.

5. The process of manufacture of an organic nitrogenous fertilizer, which comprises bringing together a fermentable carbonaceous substance and a substantially water-insoluble hydrolyzable compound of nitrogen, and maintaining these materials in contact in a highly hydrated state under aerobic conditions for such period of time to ferment the same that the fermented mass has lost at least twenty per cent by weight of its dry matter.

6. The process of manufacture of an organic nitrogenous fertilizer, which comprises bringing together cereal waste and a substantially water-insoluble hydrolyzable compound of nitrogen, and maintaining these materials in contact in a highly hydrated state under aerobic conditions for a period of time sufficient to permit the ammonia assimilator organisms in the cereal waste to ferment the same and transform the initially supplied nitrogen into new, water-insoluble, organic nitrogenous compounds in substantial quantity within the fermented mass.

7. The process of manufacture of an organic nitrogenous fertilizer, which comprises bringing together straw and a substantially water-insoluble hydrolyzable compound of nitrogen, and maintaining these materials in contact in a highly hydrated state under aerobic conditions for a period of time sufficient to permit the ammonia assimilator organisms in the straw to ferment the same and transform the initially supplied nitrogen into new, water-insoluble, organic nitrogenous compounds in substantial quantity within the fermented mass.

8. The process of manufacture of an organic nitrogenous fertilizer, which comprises bringing together straw and calcium cyanamide and maintaining these materials in contact in a highly hydrated state under aerobic conditions for a period of time sufficient to permit the ammonia assimilator organisms in the straw to ferment the same and transform the cyanamide nitrogen into new, water-insoluble, organic nitrogenous compounds in substantial quantity within the fermented mass.

9. The process of manufacture of an organic nitrogenous fertilizer which comprises bringing together straw and calcium cyanamide and maintaining these materials in contact in a highly hydrated state under aerobic conditions for a period of time sufficient to permit the ammonia assimilator organisms in the straw to ferment the same and transform the cyanamide nitrogen into new, water-insoluble, organic nitrogenous compounds to the degree of "loading" therewith the fermented mass.

10. The process of manufacture of an organic nitrogenous fertilizer, which comprises bringing together a fermentable carbonaceous substance containing at least thirty per cent of carbohydrate-like material and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially supplied nitrogen into new, water-insoluble, organic nitrogenous compounds in substantial quantity within the fermented mass.

11. The process of manufacture of an organic nitrogenous fertilizer, which comprises bringing together a fermentable carbonaceous substance containing at least thirty per cent of carbohydrate-like material and a substantially water-insoluble hydrolyzable compound of nitrogen, and maintaining these materials in contact in a highly hydrated state under aerobic conditions for a period of time sufficient to permit the ammonia assimilator organisms in the said carbonaceous substance to ferment the same and transform the initially supplied nitrogen into new, water-insoluble, organic nitrogenous compounds to the degree of "loading" therewith the fermented mass.

12. The process of manufacture of an organic nitrogenous fertilizer, which comprises bringing together straw and a substantially water-insoluble hydrolyzable compound of nitrogen, hydrating the mass to a water content of substantially seventy-five to eighty per cent of water, and maintaining the hydrated materials in contact under aerobic conditions for a period of time sufficient to permit the ammonia assimilator organisms in the straw to ferment the same and transform the initially supplied nitrogen into new, water-insoluble, organic nitrogenous compounds in substantial quantity within the fermented mass.

13. The process of manufacture of an organic nitrogenous fertilizer, which comprises bringing together straw and calcium cyanamide, hydrating the mass to a water content of substantially seventy-five to eighty per cent, and maintaining the hydrated materials in contact under aerobic conditions for a period of time sufficient to permit the ammonia assimilator organisms in the straw to ferment the same and transform the cyanamide nitrogen into new, water-insoluble, organic nitrogenous compounds in substantial quantity within the fermented mass.

14. The process of manufacture of an organic nitrogenous fertilizer, which comprises bringing together a fermentable carbonaceous material and calcium cyanamide in the proportion to provide substantially one part of elemental nitrogen to twenty to sixty parts of carbohydrate-like material in the raw carbonaceous substance, and maintaining these materials in contact in a highly hydrated state under aerobic conditions for a period of time sufficient to permit the ammonia assimilator organisms in the said carbonaceous substance to ferment the same and bring the cyanamide nitrogen into combination with the carbonaceous substance substantially in the proportion stated.

15. The process of manufacture of an organic nitrogenous fertilizer, which comprises bringing together a fermentable carbonaceous substance and a substantially water-insoluble hydrolyzable compound of nitrogen, and maintaining these materials in contact in a highly hydrated state under aerobic conditions for such period of time to ferment the carbonaceous substance that the fermented product contains substantially ninety per cent of its nitrogen content in the form of water-insoluble organic recombined nitrogen.

16. The process of manufacture of an organic nitrogenous fertilizer, which comprises bringing together a fermentable carbonaceous substance, a substantially water-insoluble hydrolyzable compound of nitrogen, and ground mineral phosphate, and maintaining these materials in contact in a highly hydrated state under aerobic conditions for a period of time sufficient to permit the ammonia assimilator organisms in the said carbonaceous substance to ferment the same and transform the initially supplied nitrogen into new, water-insoluble, organic nitrogenous compounds in substantial quantity within the fermented mass.

17. The process of manufacture of an organic nitrogenous fertilizer which comprises bringing together a fermentable carbonaceous substance and a substantially water-insoluble hydrolyzable compound of nitrogen, hydrating the mass by the addition of the necessary quantity of water in separate charges, the second charge of water being made at about the time that the fermentation mass attains a substantial temperature rise, and on completion of the hydration of the mass maintaining the same for a further period of time sufficient to permit the ammonia assimilator organisms in the carbonaceous substance to ferment the same and transform the initially supplied nitrogen into new, water-insoluble, organic nitrogenous compounds in substantial quantity within the fermented mass.

18. The process of manufacture of an organic nitrogenous fertilizer, which consists in maintaining under aerobic conditions a stack formed of beds of straw having interspersed between them calcium cyanamide in substantially finely subdivided form and containing substantially seventy-five to eighty-five per cent of water for such period of time as to convert by fermentation substantially ninety per cent of the cyanamide nitrogen into new, water-insoluble, organic nitrogenous compounds.

19. In the manufacture of a fertilizer by aerobic fermentation of a fermentable carbonaceous substance in presence of nitrogen to be combined therewith, said nitrogen derived from the nitrogen supply of a mixture comprising as essential components a substantially water-insoluble hydrolyzable compound of nitrogen, and a counter-acid neutralizing agent admixed together and in subdivided form.

20. In the manufacture of a fertilizer by aerobic fermentation of a fermentable carbonaceous substance in presence of nitrogen to be combined therewith, said nitrogen derived from the nitrogen supply of a mixture comprising as essential components a substantially water-insoluble hydrolyzable compound of nitrogen, a counter-acid neutralizing agent, and a neutral phosphate of calcium, admixed together and in subdivided form.

21. In the manufacture of a fertilizer by aerobic fermentation of a fermentable carbonaceous substance in presence of nitrogen to be combined therewith, said nitrogen derived from the nitrogen supply of a mixture comprising as essential components calcium cyanamide and a counter-acid neutralizing agent admixed together and in subdivided form.

22. In the manufacture of a fertilizer by aerobic fermentation of a fermentable carbonaceous substance in presence of nitrogen to be combined therewith, said nitrogen derived from the nitrogen supply of a mixture composed essentially of calcium cyanamide with calcium carbonate in substantial proportion, admixed together and in subdivided form.

23. In the manufacture of a fertilizer by aerobic fermentation of a fermentable carbonaceous substance in presence of nitrogen to be combined therewith, said nitrogen derived from the nitrogen supply of a mixture composed of calcium cyanamide, calcium carbonate and a neutral phosphate of calcium, admixed together and in subdivided form.

24. A fertilizer produced by the aerobic fermentation as hereinbefore set forth of an hydrated fermentable carbonaceous material with a substantially water-insoluble compound of nitrogen, and consisting essentially of a fermented organic nitrogenous compost having a total nitrogen content calculated on the dry matter of substantially 1 to 5 per cent, represented by unconverted nitrogen not exceeding substantially 0.35 per cent and organic nitrogen of which at least 50 per cent is convertible to nitrate on contact with the soil.

25. A fertilizer produced by the aerobic fermentation as hereinbefore set forth of an hydrated fermentable carbonaceous material with a substantially water-insoluble compound of nitrogen, and consisting essentially of a fermented organic nitrogenous compost having a total nitrogen content calculated on the dry matter of substantially 1 to 5 per cent represented by unconverted nitrogen not exceeding substantially 0.35 per cent and organic nitrogen of which at least 50 per cent is convertible to nitrate on contact with the soil, and comprising available phosphorus in excess of the quantity normally present in well-rotted farmyard manure.

26. A fertilizer produced by the aerobic fermentation as hereinbefore set forth of an hydrated fermentable carbonaceous material with a substantially water-insoluble compound of nitrogen, and consisting essentially of a fermented organic nitrogenous compost having a total nitrogen content calculated on the dry matter of substantially 1 to 5 per cent represented by about 0.1 per cent of unconverted nitrogen, and organic nitrogen of which over 50 per cent is convertible to nitrate on contact with the soil.

27. A fertilizer produced by the aerobic fermentation as hereinbefore set forth of an hydrated fermentable carbonaceous material with a substantially water-insoluble compound of nitrogen, and consisting essentially of a fermented organic nitrogenous compost having a total nitrogen content calculated on the dry matter of substantially 1 to 5 per cent represented by about 0.1 per cent of unconverted nitrogen, and organic nitrogen of which over 50 per cent is convertible to nitrate on contact with the soil, and comprising available phosphorus in excess of the quantity normally present in well-rotted farmyard manure.

28. A fertilizer produced by the aerobic fermentation as hereinbefore set forth of an hydrated fermentable carbonaceous material with a substantially water-insoluble compound of nitrogen, and consisting essentially of a fermented organic nitrogenous compost containing between about 10 to 85 per cent of water and having a total nitrogen content calculated on the dry matter of substantially 1 to 5 per cent represented by unconverted nitrogen not exceeding substantially 0.35 per cent, and organic nitrogen of which at least 50 per cent is convertible to nitrate on contact with the soil, and comprising available phosphorus in excess of the quantity usually present in well-rotted farmyard manure.

29. A fertilizer produced by the aerobic fermentation as hereinbefore set forth of an hydrated fermentable carbonaceous material with a substantially water-insoluble compound of nitrogen, and consisting essentially of a fermented organic nitrogenous compost containing between about 10 to 85 per cent of water and having a total nitrogen content calculated on the dry matter of substantially 1 to 5 per cent represented by unconverted nitrogen not exceeding substantially 0.35 per cent and organic nitrogen of which at least 50 per cent is convertible to nitrate on contact with the soil.

30. For the fermentation for the purpose described of a carbonaceous material, the distribution thereupon, in fermentable association therewith of a solid nitrogen-bearing mixture comprising a source of nitrogen in the form of a substantially water-insoluble hydrolyzable nitrogen compound and a counter-acid neutralizing agent.

31. For the fermentation for the purpose described of a carbonaceous material, the distribution thereupon, in fermentable association therewith of a solid nitrogen-bearing mixture comprising a substantially water-insoluble hydrolyzable nitrogen compound and a neutral counter-acid neutralizing agent.

32. For the fermentation for the purpose described of a carbonaceous material, the distribution thereupon, in fermentable association therewith of a solid nitrogen-bearing mixture comprising a substantially water-insoluble hydrolyzable nitrogen compound and calcium carbonate.

33. For the fermentation for the purpose described of a carbonaceous material, the distribution thereupon, in fermentable association therewith of a solid nitrogen-bearing mixture comprising a substantially water-insoluble hydrolyzable nitrogen compound, a counter-acid neutralizing agent, and a neutral phosphate of calcium.

34. For the fermentation for the purpose described of a carbonaceous material, the distribution thereupon, in fermentable association therewith of a solid nitrogen-bearing mixture comprising calcium cyanamide and a neutral counter-acid neutralizing agent.

35. For the fermentation for the purpose described of a carbonaceous material, the distribution thereupon, in fermentable association therewith of a solid nitrogen-bearing mixture comprising calcium cyanamide, a counter-acid neutralizing agent, and a neutral phosphate of calcium.

36. For the fermentation for the purpose described of a carbonaceous material, the distribution thereupon, in fermentable association therewith of a solid nitrogen-bearing mixture composed essentially of calcium cyanamide and carbonate of calcium.

37. For the fermentation for the purpose described of a carbonaceous material, the distribution thereupon, in fermentable association therewith of a solid nitrogen-bearing mixture composed essentially of calcium cyanamide, calcium carbonate, and a neutral phosphate of calcium.

38. For the fermentation for the purpose described of a carbonaceous material, the distribution thereupon, in fermentable association therewith of a solid nitrogen-bearing mixture composed of substantially 50 per cent of calcium cyanamide, 25 per cent of ground chalk and 25 per cent ground mineral phosphate.

39. For the fermentation for the purpose described of a carbonaceous material, the distribution thereupon, in fermentable association therewith of a solid nitrogen-bearing mixture composed essentially of calcium cyanamide and chalk admixed together and of a fineness that substantially 60 per cent of the mixture will pass a 100 mesh sieve.

40. For the fermentation for the purpose described of a carbonaceous material, the distribution thereupon, in fermentable association therewith of a solid nitrogen-bearing mixture composed of substantially 50 per cent of calcium cyanamide, 25 per cent of ground chalk and 25 per cent ground mineral phosphate admixed together and of a fineness that substantially 60 per cent of the mixture will pass a 100 mesh sieve.

In testimony whereof we have signed our names to this specification.

ERIC HANNAFORD RICHARDS.
HENRY BROUGHAM HUTCHINSON.